(12) United States Patent
Lahav

(10) Patent No.: US 12,541,093 B2
(45) Date of Patent: Feb. 3, 2026

(54) OPTICAL SCANNING MIRROR ASSEMBLY

(71) Applicant: RAFAEL ADVANCED DEFENSE SYSTEMS LTD., Haifa (IL)

(72) Inventor: Oded Lahav, Atzmon Segev (IL)

(73) Assignee: Rafael Advanced Defense Systems LTD., Haifa (IL)

( * ) Notice: Subject to any disclaimer, the term of this patent is extended or adjusted under 35 U.S.C. 154(b) by 752 days.

(21) Appl. No.: 17/620,075

(22) PCT Filed: Jun. 14, 2020

(86) PCT No.: PCT/IL2020/050657
§ 371 (c)(1),
(2) Date: Dec. 16, 2021

(87) PCT Pub. No.: WO2020/255118
PCT Pub. Date: Dec. 24, 2020

(65) Prior Publication Data
US 2022/0308338 A1    Sep. 29, 2022

(30) Foreign Application Priority Data

Jun. 16, 2019  (IL) .......................................... 267384

(51) Int. Cl.
G02B 26/10    (2006.01)
G02B 27/12    (2006.01)
H04N 23/55    (2023.01)

(52) U.S. Cl.
CPC ......... *G02B 26/105* (2013.01); *G02B 27/126* (2013.01); *H04N 23/55* (2023.01)

(58) Field of Classification Search
None
See application file for complete search history.

(56) References Cited

U.S. PATENT DOCUMENTS

| | | | |
|---|---|---|---|
| 5,863,125 A | 1/1999 | Doany | |
| 6,748,132 B1 | 6/2004 | Kapany et al. | |
| 2005/0237511 A1 | 10/2005 | Takahashi et al. | |
| 2008/0084545 A1 | 4/2008 | Chen et al. | |
| 2012/0300276 A1* | 11/2012 | Ohnishi | G02B 27/0031 359/205.1 |
| 2013/0142500 A1 | 6/2013 | Yavin | |
| 2017/0285453 A1* | 10/2017 | Morant | G03B 21/2066 |

(Continued)

FOREIGN PATENT DOCUMENTS

| | | |
|---|---|---|
| DE | 2141337 A1 | 2/1973 |
| DE | 3902456 A1 | 8/1989 |

(Continued)

OTHER PUBLICATIONS

Extended European Search Report, European Patent Office Application No. 20827302.9, mailing date Jun. 22, 2023, 11 pages.

(Continued)

*Primary Examiner* — Jyotsna V Dabbi
(74) *Attorney, Agent, or Firm* — Mintz, Levin, Cohn, Ferris, Glovsky and Popeo, P.C.; Daniel R. Brownstone

(57) ABSTRACT

A total inner reflection (TIR) prism comprises two essentially triangular prisms separated by an optical coating or by a thin layer of air, wherein one of said two triangular prisms is shaped as an isosceles triangle.

8 Claims, 4 Drawing Sheets

(56) References Cited

U.S. PATENT DOCUMENTS

| | | | |
|---|---|---|---|
| 2018/0081168 A1* | 3/2018 | Shpunt | G01S 7/4811 |
| 2018/0284395 A1 | 10/2018 | Chien et al. | |
| 2019/0011714 A1 | 1/2019 | Hendrix et al. | |
| 2021/0190919 A1* | 6/2021 | de Mersseman | G01S 17/931 |

FOREIGN PATENT DOCUMENTS

| | | |
|---|---|---|
| EP | 0341385 A2 | 11/1989 |
| JP | 2015081931 A | 4/2015 |

OTHER PUBLICATIONS

PCT International Search Report and Written Opinion, PCT Application No. PCT/IL2020/050657, Sep. 29, 2020, 8 pages.
Cedrat Technologies, Fine & Fast Steering Mirrors brochure, Oct. 2020, 10 pages.
Digital micromirror device, last edited on Jul. 30, 2022 in Wikipedia, 2022, 4 pages, [Online][Retrieved Sep. 28, 2022], Retrieved from the internet <URL:https://en.wikipedia.org/wiki/Digital_micromirror_device>.
International Preliminary Report on Patentability, Chapter II, Patent Cooperation Treaty Application No. PCT/IL2020/050657, Dec. 30, 2021, 8 pages.
Sun, J. et al., "Conceptual Design and Image Motion Compensation Rate Analysis of Two-Axis Fast Steering Mirror for Dynamic Scan and Stare Imaging System," Sensors 2021, 21, 6441, 22 pages, https://doi.org/10.3390/s21196441.

* cited by examiner

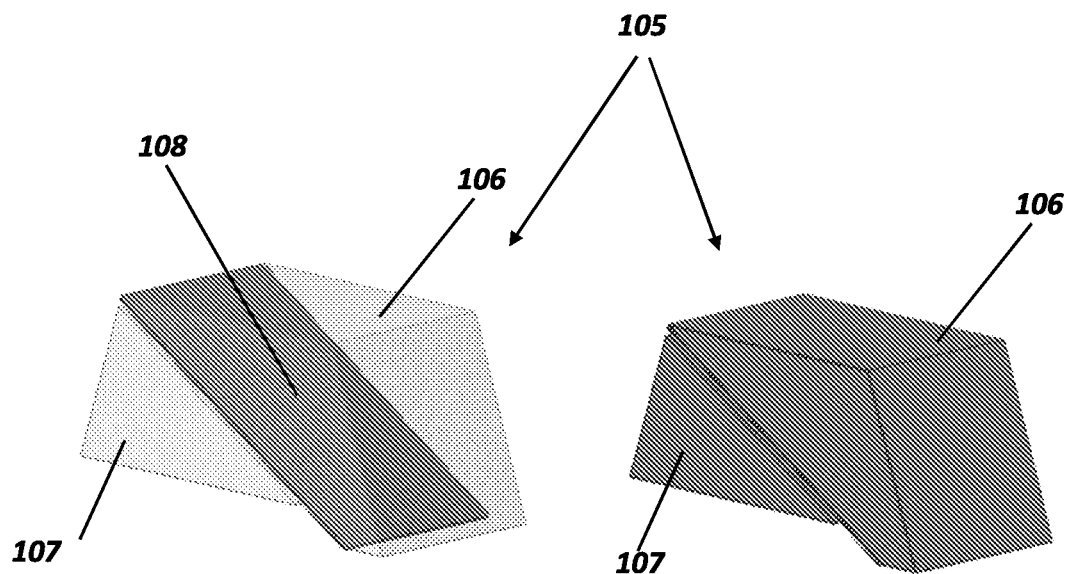
Fig. 3 (b)  Fig. 3 (a)
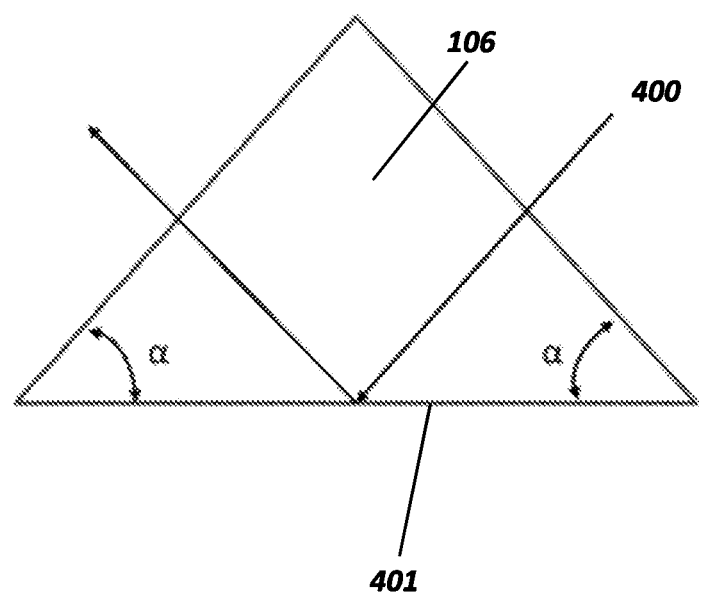
Fig. 4

OPTICAL SCANNING MIRROR ASSEMBLY

FIELD OF THE INVENTION

The present invention relates to imaging systems. More particularly, the invention relates a bi-axial mirror assembly useful in an aerial imaging system.

BACKGROUND OF THE INVENTION

Optical imaging systems are widely used to obtain high-quality images of a broad area on the ground, taken from the air. Such imaging systems are typically mounted on an aircraft or a drone and, therefore, the size and weight of such systems are important factors. However, a primary consideration in such systems is the quality of the image they acquire. The art has provided different options for such systems, each of which exhibits some disadvantages. One option is to provide a plurality of optical detectors with a narrow field of view, which together create a broad field of view with high-resolution. This solution, however, is expensive both in terms of cost and of the size of the equipment with the space it requires.

An alternative solution employs a single optical detector with a relatively narrow field of view, combined with two moving optical elements, such as mirrors, which combination allows for a broad scanning of the desired area. Combining two moving elements is required, according to this solution, to avoid a rolling of the image on the detector, which results in "holes" in the coverage of the area. However, the need to use two moving elements results in very large mirrors because the second mirror needs to encompass the whole range of angles received from the first mirror. This, in turn, results in a system that is heavy, bulky, and needs powerful engines that generate heat that must be dissipated, as well as substantial power supply.

To date, the art has failed to provide a solution to the above-mentioned drawbacks. It is therefore clear that it would be highly advantageous to provide a system free from the disadvantages described above.

It is an object of the present invention to provide an optical system that overcomes the drawbacks of the prior art.

It is another object of the invention to provide an optical system free from the need to use two moving optical elements.

It is a further object of the invention to provide an optical imaging system which is compact, efficient and simple to ensemble.

Other objects and advantages of the invention will become apparent as the description proceeds.

SUMMARY OF THE INVENTION

In one aspect the invention relates to a total inner reflection (TIR) prism comprising two essentially triangular prisms separated by an optical coating or by a thin layer of air, wherein one of said two triangular prisms is shaped as an isosceles triangle. In one embodiment of the invention the TIR angle is of the order of 40°.

In one embodiment of the invention both essentially triangular prisms are made of the same material. Examples of suitable materials from which the prisms can be made include silicon, zinc chloride and calcium fluoride.

The optical coating can be made of the plurality of materials and for instance, is selected from among germanium, zinc sulfide, zinc sulfide cleartran, calcium fluoride, and magnesium fluoride. In the case in which no coating is required and air separates between the surfaces of the prisms, the thin layer of air has a thickness of between 0.1 and 0.3 mm.

The invention is also directed to an optical imaging system comprising a bi-axial mirror and a TIR prism. The optical imaging system of the invention comprises a scanning mirror positioned above the TIR prism. Light leaving the TIR prism reaches an optical lenses assembly from which it is transmitted to a sensor. The scanning mirror is essentially parallel to the ground wherefrom an image is to be acquired.

In one embodiment the optical imaging system comprises mirrors suitable to transmit light to and from the optical lenses assembly.

In a further embodiment the system is adapted to simultaneously allow the passage of light of different wavelengths, selected from visible light, infrared light and laser.

In one embodiment of the invention it is allowed that the scanning mirror has an angle of no more than 20° from the scanning object, and wherein distortion resulting from said roll is corrected using image processing means. In this embodiment the optical imaging system further comprises image processing apparatus suitable to correct a distortion in the acquired image resulted from an angle of the scanning mirror.

BRIEF DESCRIPTION OF THE DRAWINGS

In the drawings:

FIG. 3(a) illustrates the outer structure of an optical element according to one embodiment of the invention, and FIG. 3(b) is a transparent view;

FIG. 4 schematically illustrates the optical path of the optical element of FIG. 3.

DETAILED DESCRIPTION OF THE INVENTION

Figure 1:
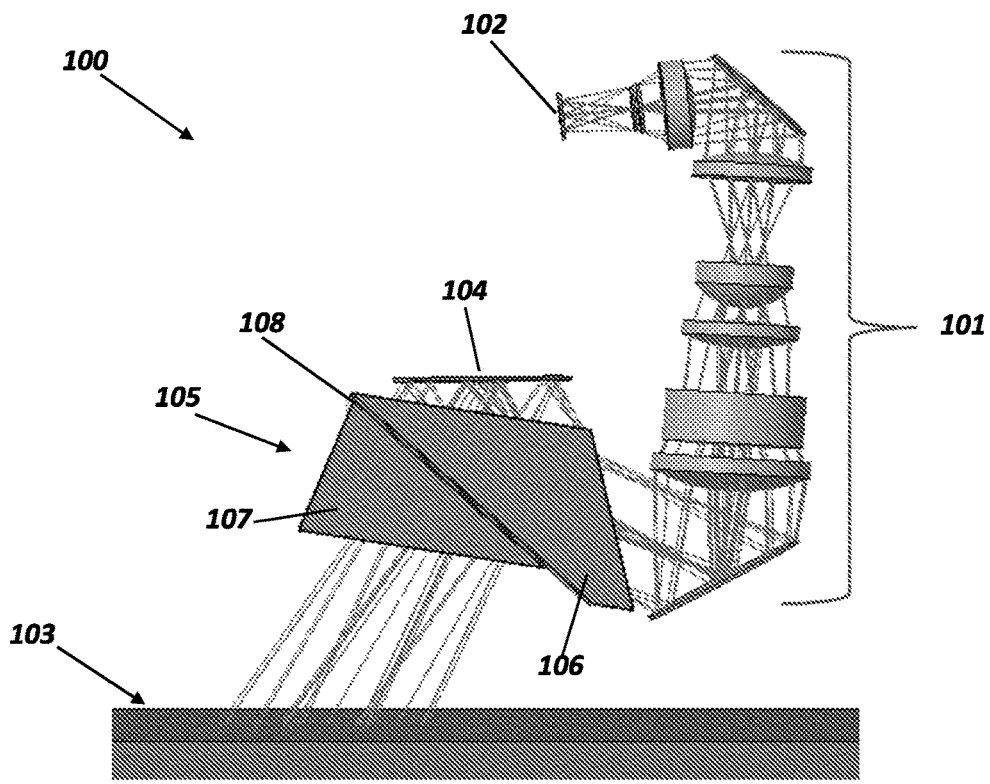
FIG. 1 schematically illustrates the operation of the system according to one embodiment of the invention.

The optical imaging system 100 of FIG. 1 comprises a number of elements and operates in the manner described hereinafter. Optical lens system collectively indicated by numeral 101 transmits an image to detector 102. The images acquired from the ground 103, using in combination scanning mirror 104 in the prism assembly 105, consisting of prism 106 and prism 107 separated by coating 108 which, in some cases, e.g. when the prism is made of calcium fluoride, can be replaced by a thin layer of air. Mirror 104 is capable of bi-axial movement (yaw and pitch), and the prism assembly 105 according to the invention, that will be further discussed with reference to FIG. 3. As said, an image from the ground (indicated by numeral 103) is reflected by mirror 104 unto prism assembly 105, as described hereinafter, from which the image is reflected, via optical lens system 101 unto an optical detector schematically indicated by numeral 102.

Figure 2:
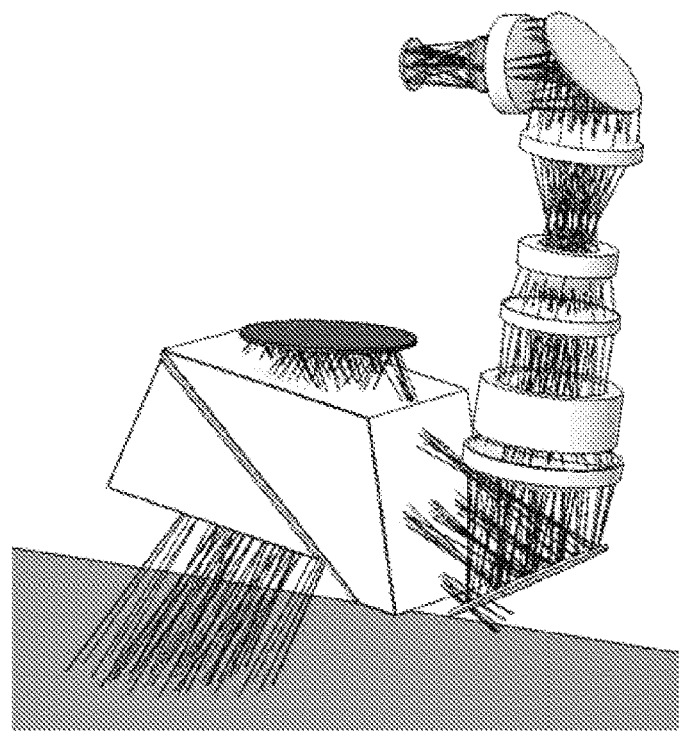
FIG. 2 (a-d) shows different views of the system of FIG. 1, illustrating the Corporation and positioning of the various elements of the system.
Figure 2:
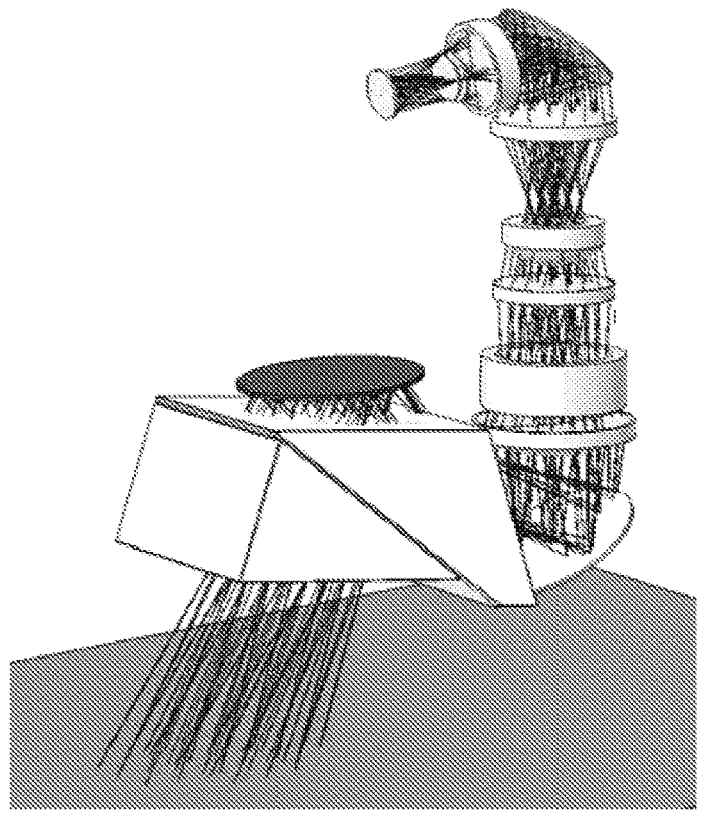
Figure 2:
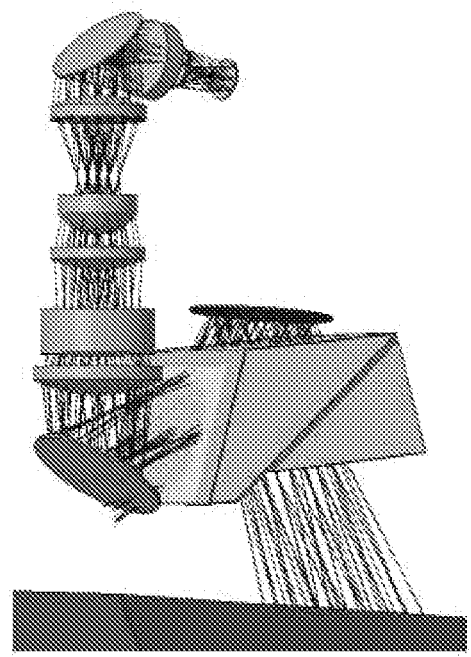
Figure 2:
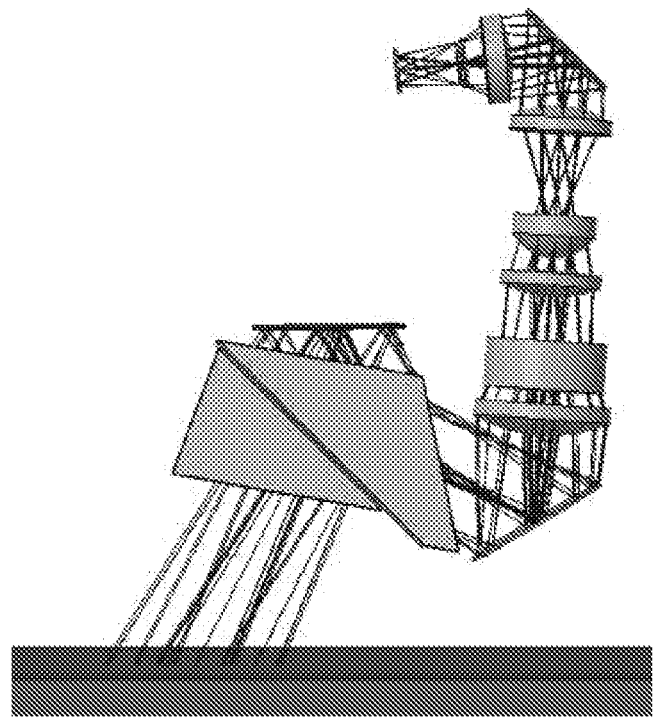

FIG. 2 shows the imaging system of FIG. 1 seen from various angles, which allows viewing the positioned relationship of the various elements of the system.

Turning now to FIG. 3, the optical element 105 of FIG. 1, constructed according to the invention, is shown in solid view in FIG. 4(a), and in transparent view in FIG. 4(b). Element 105 consists of two prisms, 106 and 107 made of the same material, and is provided with a coating of reflective material in the boundary layer 108 between them, as clearly illustrated in FIG. 3 (*b*). Optical element 105 will be termed hereinafter "total inner reflection (TIR) prism". Constructing the TIR prism as separate pieces allows to use the same plane both to reflect and to transfer images, depending on the angle of incidence of incoming rays. This structure accomplishes important advantages inasmuch as it allows reducing the size of the scanning opening and the positioning of the scanning mirror that is parallel to the ground, thereby resulting in a scanning with very minimal rolling. In this context, the term "parallel to the ground" should be interpreted to include also small positioning angles, of up to 20% the effect of which can be solved by using image processing techniques.

The angle of incidence a of the incoming rays 400 with TIR plane 401 is dictated by the ratio between the deflection coefficients of the materials which prisms 106 and 107 of FIG. 3 and the coating 108 are made. In one embodiment of the invention prisms 106 and 107 are made of silicon, and coating 108 is made of zinc sulfate. The skilled person will easily recognize suitable materials other than the above that can be employed in a TIR prism according to the invention. When the prism is made of silicon, its refractive index must be of the order of magnitude of that of zinc sulfate. In contrast, if the prism is made of calcium fluoride no coating is required but an air layer of 0.1-0.2 mm must be left between the parts. Using calcium fluoride allows to provide different channels, including visible light, infrared light and laser simultaneously or separately. The aim in all cases, regardless of the material of which the prism is made, is to reach a critical angle of 40°. Another suitable material is, for instance, cleartran, such as for instance Zinc Sulfide Cleartran™ manufactured by Edmund Optics (www.edmundoptics.com). According to one embodiment of the invention, coating 108 is provided in prism 106, but it can alternatively be provided on prism 107, or on both surfaces.

When constructing TIR prism 105 it is imperative that the basic structure of prism 106 be that of an isosceles triangle, although it is possible to remove its edge that extends beyond prism 107, as illustrated in the figures. This structure is necessary to avoid chromatic problems due to deflection coefficients that are different for different wavelengthS, requiring the material through which light passes to behave like a window.

According to one embodiment of the invention the TIR angle (i.e., the deflection angle between the prism material and the coating, for example silicon and zinc sulfide) is of the order of 40°, in order to minimize the prism size. The skilled person will easily appreciate that in order to accomplish this result appropriate materials must be selected for the various parts of the optical element. For instance, when silicon is employed as a building material for the prisms, the coating layer can be made of material selected, for example and without limitation, from germanium, zinc sulfide, zinc sulfide cleartran, calcium fluoride, and magnesium fluoride.

All the above detailed description has been provided for the purpose of illustration and is not intended to limit the invention in any way. Many modifications both in the structure of the optical system and in the materials employed can be performed by the skilled person without exceeding the scope of the claims.

The invention claimed is:

1. An optical imaging system comprising a bi-axial mirror and a TIR prism comprising two triangular prisms separated by an optical coating or by a thin layer of air, wherein one of said two triangular prisms is shaped as an isosceles triangle, wherein said bi-axial mirror comprises a scanning mirror configured to perform continuous scanning movement in both yaw and pitch axes to direct light originating from different portions of a scene through the TIR prism to form captured images on a digital image sensor.

2. The optical imaging system of claim 1, wherein the bi-axial mirror is positioned to receive light traveling from the scene before said light enters the TIR prism.

3. The optical imaging system of claim 2, wherein light from the scene leaving the TIR prism reaches an optical lenses assembly from which it is focused onto the digital image sensor and wherein the digital image sensor is configured to capture digital images of the scene.

4. The optical imaging system of claim 3, comprising mirrors suitable to transmit light to and from the optical lenses assembly.

5. The optical imaging system of claim 2, wherein the scanning mirror is essentially parallel to the ground wherefrom an image is to be acquired and is oriented such that its reflective surface is perpendicular to a vertical optical axis extending between the scene and the system, enabling the scanning mirror to receive light from the scene below and direct it through the TIR prism.

6. The optical imaging system of claim 5, wherein the scanning mirror has an angle of up to 20° from its perpendicular orientation to the vertical optical axis, and wherein any distortion resulting from said angle is corrected using image processing means.

7. The optical imaging system of claim 5, further comprising image processing apparatus suitable to correct a distortion in the acquired image resulted from an angle of the scanning mirror.

8. A system according to claim 1, which is adapted to simultaneously allow the passage of light of different wavelengths, selected from visible light, infrared light and laser.

* * * * *